Oct. 13, 1959
M. AMBARCUMIAN
2,908,411
HYDRAULIC DUMPING BIN LOADER
Filed Aug. 5, 1957
3 Sheets-Sheet 1
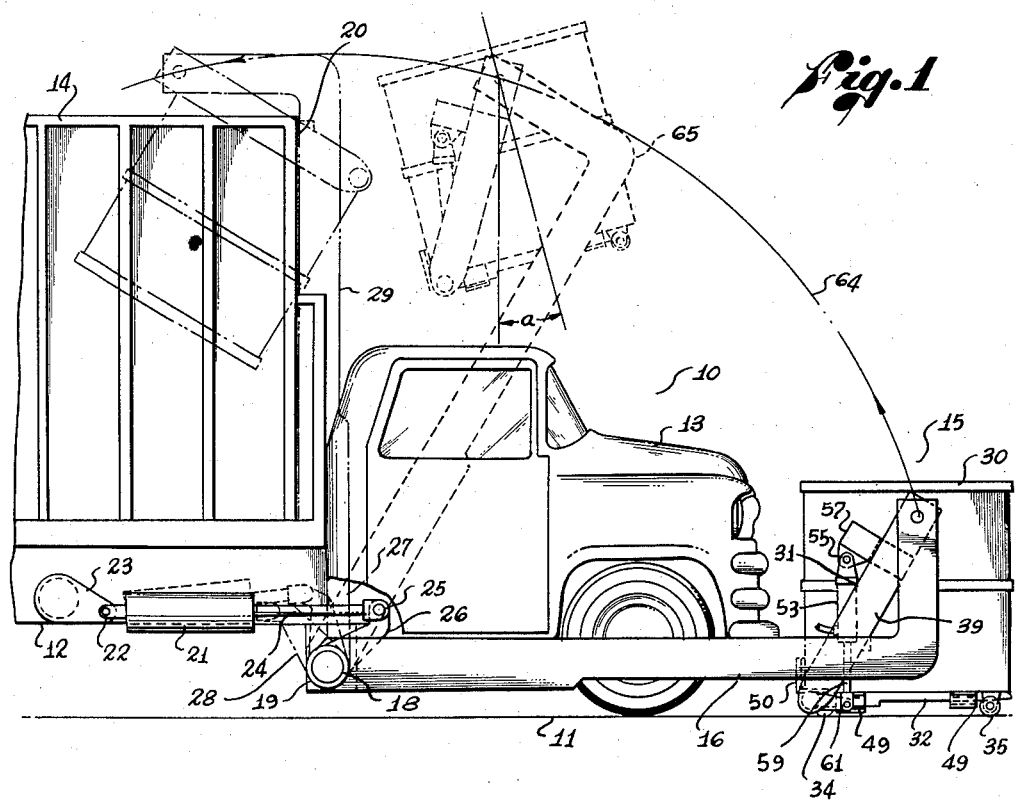
Fig.1
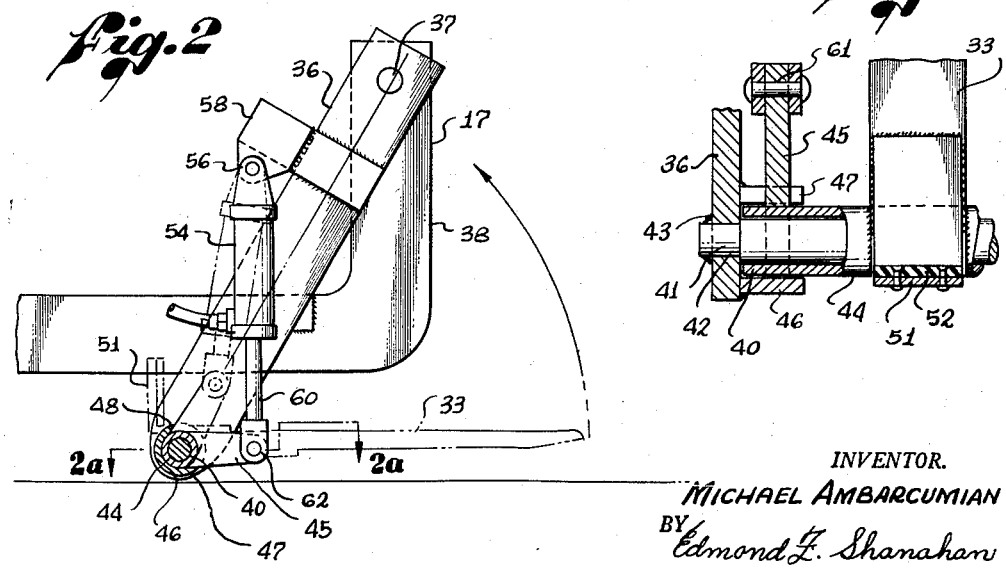
Fig.2
Fig.2a
INVENTOR.
MICHAEL AMBARCUMIAN
BY Edmond F. Shanahan
Attorney

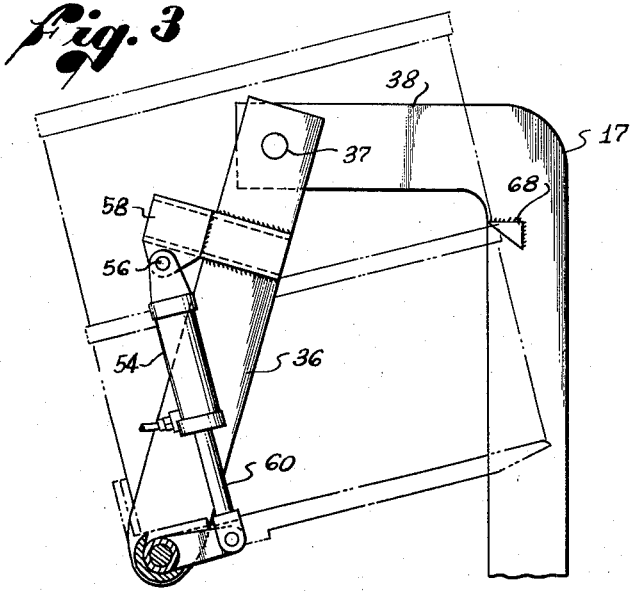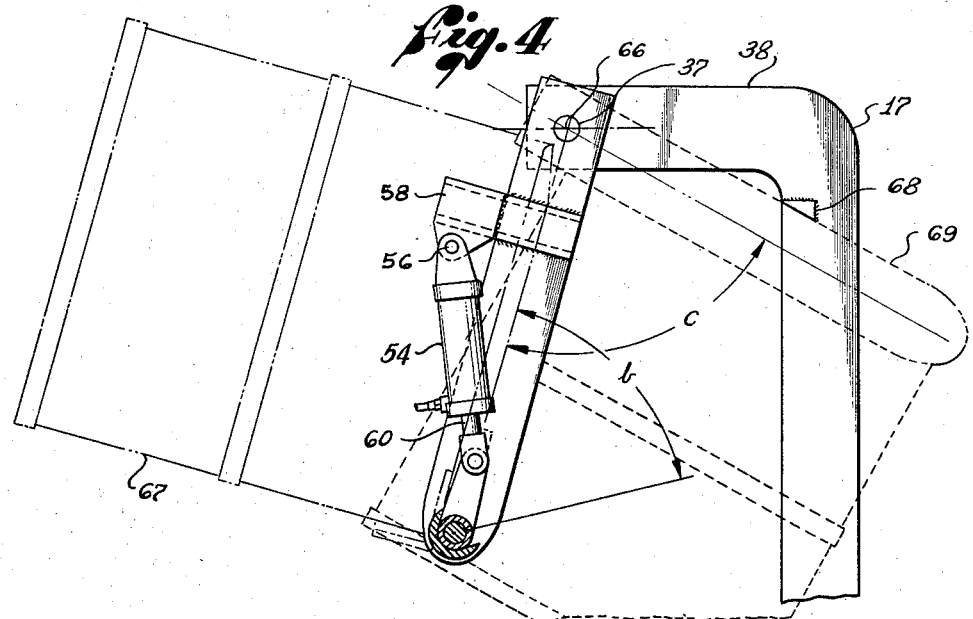

Oct. 13, 1959     M. AMBARCUMIAN     2,908,411
HYDRAULIC DUMPING BIN LOADER
Filed Aug. 5, 1957     3 Sheets-Sheet 3
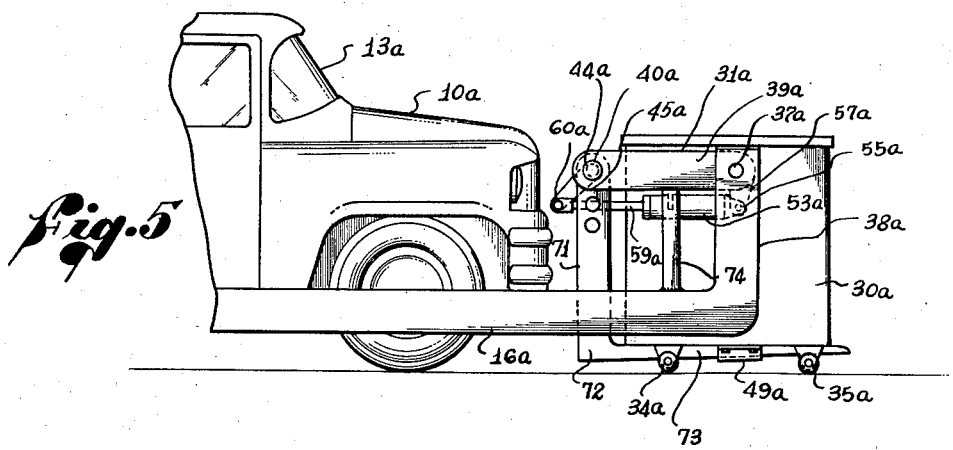
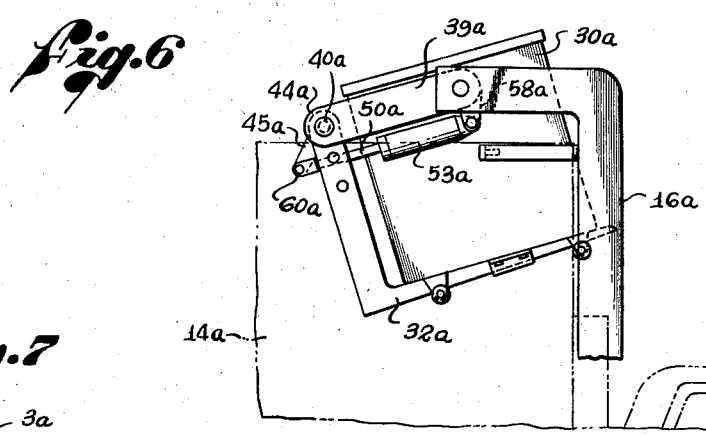
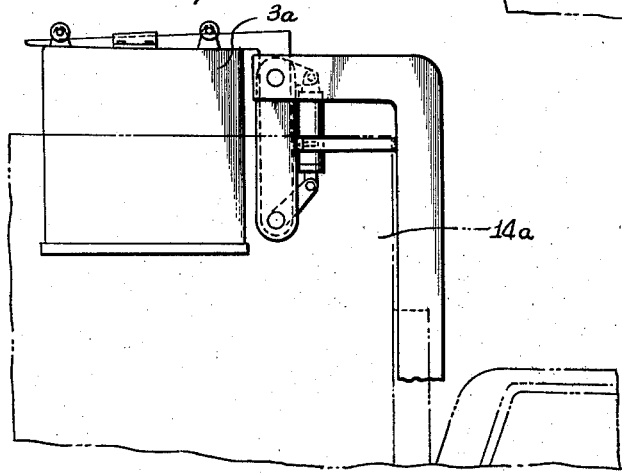
INVENTOR.
MICHAEL AMBARCUMIAN
BY Edmond F. Shanahan
Attorney United States Patent Office 2,908,411
Patented Oct. 13, 1959

2,908,411

HYDRAULIC DUMPING BIN LOADER

Michael Ambarcumian, Los Angeles, Calif.

Application August 5, 1957, Serial No. 676,066

6 Claims. (Cl. 214—302)

This invention relates generally to loader apparatus for refuse collection trucks and the like, and more particularly to a loader apparatus comprised of a pair of rigid arms for lifting a tiltably supported bin from a ground level position in front of the cab to a dumping position, and hydraulic means for rotating the bin to an inverted position.

Refuse collection trucks are built by mounting a specially constructed body or special attachments on a standard motor truck chassis or truck bed. The most important features of modern refuse collection trucks are the means for loading and the means for unloading the truck body. Most present refuse collection trucks are of a type which may be referred to as rear loading, since the loader used is ordinarily a hopper or bucket pick-up at ground level near the rear end of the truck. Unloading is accomplished either by swinging the loading mechanism out of the way, or by opening the side of the truck.

Rear loading refuse collection trucks have serious disadvantages in house to house or store to store refuse collection. It is difficult and sometimes impossible for the truck driver to place the rear loader at a pick-up point nearest the refuse to be collected. The motor truck cannot be maneuvered as well in the reverse as in the forward direction; and the operator cannot place the rear end of the truck as accurately as he can the front, since he must rely on signals from his helpers rather than his own eyes. Secondly, unloading the truck is more complicated and awkward if the rear end is encumbered with a rear end loader. Side unloading is inefficient. The most practical method of unloading is always to unload from the rear of the truck; but if a rear loader is employed, some complex method must be used for getting it out of the way during the unloading process.

Although the advantages of a loader operating in front of the driver's cab have been recognized, and a few forward loader trucks have been built, most of these have been unsatisfactory either because they tended to spill refuse on the driver's cab during loading, or because they were too complex and expensive. Also, they tended to accumulate refuse in the forward end of the truck so that the operating crew found it necessary to stop occasionally and distribute the load towards the rear.

Many of the forward loaders heretofore built have employed jointed arms for handling the loading bucket, but the relative complexity of operation of these devices have made them vulnerable to breakdown.

Other previously known forward loaders have made use of tracks disposed on each side of the driver's cab, but these have been objectionable since they presented permanent obstructions to the vision of the driver.

It is a major object of the present invention to provide a forward loader for refuse collection trucks, which is mechanically simple, relatively inexpensive to build, and strong enough to withstand rough usage without requiring more than a minimum of maintenance and repair.

Another object of the invention is to provide a forward loader capable of lifting a container of refuse from the ground to the truck body without any substantial spilling of material on the cab.

Still another object of the invention is to provide a forward loader with simple and positive means for dumping the loader refuse container after it has been raised to a loading position.

These and other objects of the invention are accomplished by means of a forward loader comprised principally of two rigid loader arms, one on each side of the driver's cab, a swinging cradle carried between said loader arms, a container rotatably mounted in said swinging cradle, and hydraulic means for inverting said container by shifting its center of gravity relative to said cradle. The invention, in its preferred form, provides a simple pendulum suspension of the rubbish containing bin which eliminates the need for jointed loader arms, and prevents unwanted spillage from occurring when the bin is raised from ground level to dumping position just back of the cab.

An additional advantage of the preferred form of the invention described in connection with the accompanying drawings is that the loader container is in the form of a bin mounted on casters, which bin can be removed from the swinging cradle and rolled to the point at which it is to be filled. When loaded, it can be returned to the refuse collection truck and easily replaced in the cradle.

If desired, several bins may be used interchangeably. A refuse collection bin may be left at each pick-up location to serve as a convenient storage unit between pick-ups by the refuse collection truck.

These and other objects and advantages of the invention will be understood from a reading of the following description of a preferred embodiment, taken in connection with the accompanying illustrations, in which:

Figure 1 is a right side elevational view of a refuse collection truck showing the hydraulic bin loader in full line at ground level, and in dashed or phantom line at positions assumed during the loading operation;

Figure 2 shows a right side elevational view of the end of the left loader arm to reveal in enlarged detail the construction of the swinging cradle and the hydraulic dumping means;

Figure 2a is a plan view, partly in section, of a part of the cradle structure illustrated in Figure 2, as seen in the direction of the arrows 2–A in Figure 2;

Figure 3 is a right side elevational view of the swinging end of the left loader arm raised into dumping position before the bin has been inverted; and Figure 4 is a view similar to that of Figure 3, but taken after the hydraulic mechanicm has been operated to invert the bin, completing the dumping operation.

Figure 5 is a right side elevational view of the forward part of the refuse collection truck showing a second specific embodiment of the hydraulic bin loader, with the lifting arms lowered to forward position and the bin resting on the ground;

Figure 6 shows the hydraulic bin loader of Figure 5 with the lifting arms raised to their vertical position, and the bin swinging from the ends of the lifting arms, just before dumping operation; and Figure 7 shows the bin dumped into a fully inverted position by the hydraulic dumping means.

The truck 10 is comprised principally of a standard truck chassis 12, a forward operator's cab 13, and a load carrying body 14, which may be of any suitable construction with a forward opening for receiving the loader to be described hereinafter, preferably, being constructed along the general lines described in the application Serial Number 640,651, filed February 18, 1957, now abandoned.

A loader apparatus, indicated generally by the numeral 15, preferably mounted on the forward end of refuse collection truck 10 as shown in the side view of Figure 1, accomplishes its lifting by means of a pair of rigid loader arms, right arm 16 being visible in Figure 1, and left arm 17, substantially identical to right arm 16, but mounted on the left side of the cab 13, being shown fragmentarily in the views of Figure 2, Figures 2-a, 3, and 4.

The loader arms 16 and 17 swing through a ninety degree angle about the axis of a transversely disposed shaft 18 to the ends of which they are integrally attached. The shaft 18 is rotatably mounted in journal bearings 19 located in the truck frame 12 just back of the cab 13 and below the hopper opening 20 of the truck body 14.

The loader arms 16 and 17 are swung upwardly from the lowered bin-loading position illustrated in Figure 1 to raised dumping position by rotating the shaft 18. Preferably, this is accomplished by means of a pair of hydraulic cylinders, only the right side hydraulic cylinder 21 being shown in these drawings, the left side cylinder being identical.

The cylinder 21 is pivotally mounted by a pin mounting 22 at its inactive end; the pen mounting 22 is carried on a bracket 23 mounted on the truck chassis 12.

The double acting plunger 24 is pivotally connected at 25 to the end of a lever arm 26 mounted integrally with the transverse shaft 18. Preferably, the underside of the operator's cab 13 is recessed to provide a partially enclosed chamber 27 revealed by the broken away part of the cab 13, in which the lever arm 26 may be swung through its angle of rotation as indicated by the dashed line 28, when the plunger 24 is retracted to lift the loader arms 16 and 17 into raised dumping position, as indicated by the phantom lines 29.

A loader bin 30 is disposed transversely to the truck 10 at ground level 11 just forward of the cab 13. It is received between the forward swinging ends of the arms 16 and 17, being swingably suspended from them by means of a cradle means indicated generally by the numeral 31 and to be described in detail hereinafter.

Preferably, the bin 30 is readily removable from a pair of forwardly projecting fork members 32 and 33 (seen in Figures 1 and 2 respectively) comprising a part of the cradle 31. Also, preferably, the bin 30 is provided with four casters on its bottom, the two right casters 34 and 35 being visible in the right side elevational view of Figure 1. The bin 30 is dimensioned to be readily received in the hopper opening 20 of the truck body 14 when the dumping operation is carried out with the loader apparatus.

The construction of the cradle 31 will be understood from a description of its left part in connection with the drawings of Figure 2 and 2a, since its right and left sides are symmetrical. It is seen in Figure 2 that the left cradle arm 36 is swingably carried in a trunnion 37 in the upwardly extending right angle extension 38 of the loader arm 17.

The lower swinging ends of the two cradle arms, left cradle arm 36 shown in Figure 2, right cradle arm 39 shown in Figure 1, are connected by a transversely disposed shaft 40. The reduced end 41 of the shaft is received through a bore 42 in the cradle arm 36 and fastened in position, in this embodiment by a weld 43.

The shaft 40 is encosed in a sleeve 44, which is sufficiently loose to rotate freely on the shaft within limits set by engagement between a sleeve lever 45, rotating integrally with the sleeve 44, and a cylindrical stop 46, which is carried on the cradle arm 36 concentrically with the shaft 40 and the sleeve 44. As best seen in the sectioned portion of Figure 2, the cylindrical stop 46 is only little more than a half cylinder, so that it presents stopping surfaces 47 and 48 corresponding respectively to upright and inverted bin positions illustrated in Figures 3 and 4.

The rotating sleeve 44 carries a pair of forwardly projecting forks 32 and 33, similar to the forks on a lift truck, and adapted to slide under the bin 30 when the loader 15 is in lowered position and the sleeve 44 is rotated to bring the sleeve lever 45 into the generally horizontal position shown in Figure 2 and corresponding to the upright bin position. The undersurface of the bin 30 is provided with four metal straps 49, two for each of the forks 32 and 33, to securely hold the bin 30 on the forks during inversion.

The forks 32 and 33 are provided at their rear ends, near their attachment to the sleeve 44, with upwardly projecting L-shaped stops 50 and 51, against which the bin 30 is seated when carried on the forks. Preferably, each of the stops 50 and 51 is provided with a rubber pad 52, seen in section in Figure 2a, to reduce noise of operation and cushion the bin 30 against damaging shocks.

The right and left cradle arms 39 and 36 carry double acting hydraulic cylinders 53 and 54 respectively, hung by pivoting pin joints 55 and 56 from brackets 57 and 58. The plungers 59 and 60 are pivotally connected at 60 and 61 to the swinging ends of the sleeve levers, as shown for the left sleeve lever 45 in Figure 2a.

The hydraulic cylinders 53 and 54 are supplied with hydraulic power from a hydraulic motor in the truck 10, not shown, through flexible conduits carried on the loader arms 16 and 17. Ordinarily, both the lifting cylinders 21 and the inverting cylinders 53 and 54 are controlled by means of controls in the operator's cab 13.

The manner in which the bin 30 is inverted, as illustrated in Figures 3 and 4, by the inverting cylinders 53 and 54 may best be described in connection with a description of the general operation of the refuse collection truck 10.

The truck 10 is driven to the starting point of a collection route with the loader arms 16 and 17 raised to a vertical position and the bin 30 carried inverted in the loading hopper 20, at the forward end of the truck body 14, as illustrated in phantom lines at 29 in the side view of Figure 1. In traveling between closely located stops along the collection route, the bin 30 is carried in a lowered and right-side-up position only slightly higher than that illustrated in full line in Figure 1.

At each pick-up point, the loader arms 16 and 17 are dropped a few inches to bring the loader bin casters 34 and 35 into contact with the ground surface 11. Refuse may then be dumped into the bin 30 at this location, or the bin may be rolled from the forks 32 and 33, on its casters 34 and 35, to a convenient point, and then returned to the forks, or replaced by a bin previously left at the point of collection.

When the bin 30 has been filled, or when it is desired to travel a substantial distance between collection points, the operator in cab 13 disposes his control valves to cause the raising cylinders 21 to retract their plungers 24, thus pulling the loader arm levers 26 in a counter clockwise direction, as indicated in Figure 1, to the position indicated in dashed line at 28. The loader arms 16 and 17 swing upwardly to the vertical position, the trunnion points 37 describing an arc indicated by the arrow 64.

Preferably, as soon as the bin 30 is lifted clear of the ground, its weight is so disposed that it swings into a position canted about fifteen degrees from the vertical as indicated generally in Figure 1 by the dashed outlines 65, which pictures the disposition of the loader arms 16 and 17, the cradle 31, and the bin 30 as the bin is passing over the cab 13. The tilted position thus assumed not only helps to prevent refuse from flying out of the top of the bin 30 while it is in motion in the direction of the arrows 64, but also materially assists in the inverting procedure, since the bin 30 starts from a position slightly rotated towards inversion. The angle of tilt at which the bin 30 normally hangs (assuming its contents, if any, are disposed in a normal and uniform manner) is indicated in Figure 1 by the letter "a."

When the bin 30 has been raised to dumping position, but before it has been inverted by the hydraulic inverting cylinders 53 and 54, it is hanging in the position relative to the arms 16 and 17 shown in Figure 3. At this stage, after the raising action of the loader arms 16 and 17 has been completed, the operator in the cab 13 operates valves which cause the plunger 60 to retract into the hydraulic cylinder 59 producing a rotation of the bin 30 through an angle, ordinarily about sixty degrees, and indicated by the letter "b" in Figure 4, relative to the cradle arms 36 and 39. It will be seen from Figure 4 that this rotation carries the center of gravity of the bin 30 to a point well behind the axis 66 of the trunnions 37 from which the cradle 31 is swingably suspended. This causes the bin 30 to swing under the influence of gravity to an angle "c" (see Figure 4) which may ordinarily be about sixty degrees, and is preferably limited by a stop 68 carried on the inner face of the loader arm 17. The bin 30 then assumes the position indicated in Figure 4 by the dashed outlines 69, in which it is substantially inverted, and empties its contents into the truck body 14 as shown in Figure 1 by the phantom line position 29.

When the next loading point has been reached, the operator changes the control valve arrangement to expel the plunger 60 on the hydraulic cylinders 53 and 54 to an extended position, as shown in Figure 3, and the bin 30 is shifted sufficiently relative to the cradle 31 and its axis of suspension 66 to produce a swing back to the normal carrying position of Figure 3. The raising cylinders 21 are then reversed to lower the loader arms 16 and 17 and the bin 30 to ground level for loading.

An alternative form of the invention shown in the embodiment of Figures 5, 6 and 7 is illustrated in right side elevational views only, because the left side is identical in construction. Also, the general construction, including the transverse cradle members, are identical to the construction of the embodiment of Figures 1 to 4.

The embodiment of Figures 5 to 7 is comprised of parts which correspond to those of the embodiment of Figures 1 to 4, and are, therefore, identified by the same numerals except that the letter "a" is added. It will be understood that parts not illustrated, at least in the right hand version, are identical to those employed in the embodiment described and illustrated in Figures 1 to 4.

In the right side elevational view of Figure 5, a truck indicated generally by the numeral 10a, with a cab 13a and a body 14a, is shown with a loader bin 30a disposed in front of the cab 13a between a pair of loading arms, like the two arms 16 and 17 in Figures 1 to 4, only right arm 16a being visible in Figures 5 to 7.

The loader bin 30a is substantially identical in construction with the loader bin 30 and is provided with casters, e.g., 34a and 35a, and straps 49a on the bottom.

The arm 16a is provided with an upwardly extending right angle extension 38a and carries a cradle arm 39a, which is pivoted at 37a. The cradle arm 39a is the right hand member of a cradle indicated generally by the numeral 31a which is constructed like the cradle 31 of the embodiment of Figures 1 to 4 except that the cradle arms of the embodiment of Figure 5 are relatively shorter as seen from the right arm 39a. The cradle 31a includes a left arm not shown, and a transverse shaft 40a and sleeve 45a, seen only in end view in Figures 5 to 7, but identical to the shaft 40 and sleeve 44 of the embodiment of Figures 1 to 4.

The sleeve 40a carries a pair of identical forks, only the right fork 32a being illustrated, which are received under the bin 30a in exactly the same manner as the forks 32 and 33 are received under the bin 30, and which can be rotated to dump the bin 30a in the same manner as the fork members 32 and 33 are rotated for the dumping operation. However, the forks of the embodiments of Figures 5 to 7 are significantly different from those of the embodiments of Figures 1 to 4. The fork 32a is comprised of a radial member 71, an elbow 72, and a bin-engaging blade 73, which is substantially at right angles to the radial members 71.

When the arm 16a is in lowered position, the cradle arm 39a is supported in a substantially horizontal position by a cradle arm support 74 which is welded to the arm 16a a short distance from the upwardly extending extension 38a. This will be seen to be in contrast with the position assumed by the arm 39, which is carried at an angle of about sixty degrees from the horizontal, as shown in Figure 2. The horizontal position of the cradle arm 39a co-operates with the radial part 71 of the fork 32a to place the blade 73 in proper bin engaging position when the arm 16a (and its left hand twin) have been lowered to the ground level position as shown in Figure 5.

When the arms of the loader of Figures 5 to 7 are raised, as illustrated by the position of arms 16a in Figure 6, the bin 30a swings to the backwardly tilted position shown, carrying the cradle arm 39a and the fork 32a to the position shown in the opening at the upper part of the body 14a into which the refuse is to be dumped.

The dumping operation is carried out in a manner and by a device corresponding to the manner and device of the embodiment of Figures 1 to 4, but slightly different in construction in order to achieve full inversion of the bin 30a as shown in Figure 7. A hydraulic cylinder 53a is pivotally connected at one end 57a to a bracket 58a which is an integral part of the cradle arm 39a and extends from the fulcrum end of 39a. The plunger 59a of the hydraulic cylinder 53a operates to rotate the sleeve 44a, and the fork members, such as right fork 32a, both of which are integral with the sleeve 44a just as the fork members 32 and 33 of the embodiment of Figures 1 to 4 are integral with the sleeve 44. Rotation is accomplished by means of a sleeve lever 45a to which the end of the plunger 44a is pin connected at 60a. It will be understood that the sleeve 44a, the sleeve lever 45a, and the fork 32a (as well as its mating fork member, not shown), all rotate as an integral unit. When the plunger 59a is fully retracted during the dumping operation, the bin 30a swings into the position shown in Figure 7 and is completely emptied into the truck body 14a by virtue of its fully inverted position.

After dumping, the bin 30a can be righted by reversing the hydraulic cylinder 53a to expel the cab 13a. The loader arms 16a and its left twin can then be lowered to the position of Figure 5 and the cycle repeated.

This arrangement will dump the load at a somewhat higher level than that achieved by the embodiments illustrated in Figures 1 to 4. The bin and the forks will not crowd the truck if the wrong lever is operated. The unit will always swing away from the truck bumper, the grill cowl and the cab, even if the hydraulic dumping device is improperly operated with the lifting arms in a partly or fully lower position.

It will also be obvious from the foregoing description of two specific embodiments of my invention that the bin loader can be used as a fork lift. The driver can drive into the bin and guide the forks under the bin, and lift it, dump it into the truck body, and let it down to ground level again without getting out of the truck cab.

The description of the illustrated specific embodiments set forth in the foregoing paragraphs illustrate both the general principles of my invention and particular features of one of its preferred forms. However, it is not my intention that the invention be considered as limited to the particular embodiment described and illustrated. On the contrary, the invention can be embodied in a variety of forms which depart considerably from the illustrated embodiment and it is my intention to claim as my invention all of the embodiments falling within the scope of the appended claims.

For example, it is obvious that the removability of the bin is an advantageous but not an essential feature. Also, although it is desirable to make use of four hydraulic cylinders, one on each side for raising the loader arms 16 and 17, and one on each side of the cradle 31 for inverting the bin 30, the invention also comprehends those designs making use of only one cylinder for raising the bin or only one for inverting it.

Finally, although the invention has been described in connection with refuse collection, it is readily apparent that its utility is not limited to refuse collection trucks but may advantageously be put to use in any application in which a loader for raising material from ground level to a truck body is required.

I claim:

1. A loader apparatus on a truck for lifting material from ground level and dumping said material into a load-carrying body on said truck, which apparatus includes: a pair of loader arms extending from one end of said truck and adapted to rotate together from a lowered loading position to a raised dumping position; cradle means carried between said arms and swinging freely therein under the influence of gravity as said leader arms are raised; container means rotatably mounted in said cradle means; and power means carried in said cradle means for rotating said container means relative to said cradle means.

2. A loader apparatus on a track for lifting material to a load-carrying body on said truck and dumping said material into said body, which apparatus includes: a pair of loader arms on each side of said truck rotatable about their ends on a common axis of rotation; power means for rotating said arms from a lowered position extending forward of said truck to a raised position near said body; cradle means carried between the ends of said loader arms and swinging about a cradle axis; container means carried in said cradle means and rotatable about a dumping axis parallel to but removed from said cradle axis; and power means carried on said cradle means for rotating said container means about said dumping axis through an angle sufficient to cause the center of gravity of said container to shift from one side of said dumping axis to the other.

3. A loader apparatus on a truck for lifting material from in front of the driver's cab to a load-carrying body back of said cab and dumping said material into said body, which apparatus includes: a raising shaft rotatably mounted in said truck in a transverse position; a pair of loader arms projecting from said shaft and rotating integrally therewith; reversible power means for rotating said raising shaft to move said loader arms between a lowered loading position and a raised dumping position; cradle means carried between the ends of said loader arms, said cradle means swinging freely from said loader arms under the influence of gravity as said arms are rotated with said shaft; a transversely disposed dumping shaft rotatably carried in said cradle means; a bin carried on said dumping shaft; and a hydraulic cylinder for rotating said dumping shaft to carry the center of gravity of said bin over said dumping shaft.

4. A loader apparatus as described in claim 3 in which said bin is carried on a pair of projecting fork members projecting from said shaft and rotating integrally therewith.

5. A loader apparatus on a truck for lifting material from in front of the driver's cab to a load-carrying body, and dumping said material into said body through an opening, which apparatus includes: a transversely disposed raising shaft rotatably mounted in said truck; a pair of rigid loader arms projecting from said shaft and rotating integrally therewith, said loader arms having an elbow shape to carry their ends over said truck body opening when said arms are in a raised position; hydraulic cylinder means for rotating said raising shaft to move said loader arms from a lowered loading position to a raised dumping position; a pair of cradle arms hanging down from the ends of said loader arms; a dumping shaft rotatably mounted in the lower, swinging ends of said cradle arms; fork means extending from said dumping shaft means and rotating integrally therewith; hydraulic cylinder means on at least one of said cradle arms for rotating said dumping shaft to move said fork means from a lowered loading position to a raised dumping position; a bin with means in its lower part for closely receiving said fork means under the center of gravity of said bin when said fork means are in lowered loading position; and stop means for limiting the swinging movement of said bin.

6. A loader apparatus on a truck for lifting material from in front of the driver's cab to a load-carrying body, and dumping said material into said body through an opening, which apparatus includes: a transversely disposed raising shaft rotatably mounted in said truck; a pair of rigid loader arms projecting from said shaft and rotating integrally therewith, said loader arms having an elbow shape to carry their ends over said truck body opening when said arms are in a raised position; hydraulic cylinder means for rotating said raising shaft to move said loader arms from a lowered loading position to a raised dumping position; a pair of cradle arms hanging down from the ends of said loader arms; a dumping shaft rotatably mounted in the lower, swinging ends of said cradle arms; container means carried on said dumping shaft means and rotating integrally therewith; hydraulic means for rotating said bin relative to said cradle arms from a loading position to a dumping position; and wheel members under said bin for supporting it at ground level.

References Cited in the file of this patent

UNITED STATES PATENTS

| | | |
|---|---|---|
| 2,744,642 | Sewell et al. | May 8, 1956 |
| 2,828,032 | Beasley et al. | Mar. 25, 1958 |